(12) United States Patent
Dinger et al.

(10) Patent No.: US 8,909,611 B2
(45) Date of Patent: Dec. 9, 2014

(54) CONTENT MANAGEMENT SYSTEM

(75) Inventors: Thomas J. Dinger, Sunnyvale, CA (US); Hussam Eid, Amman (JO); Jonathan Thomas Zempel, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 1097 days.

(21) Appl. No.: 11/428,333

(22) Filed: Jun. 30, 2006

(65) Prior Publication Data

US 2007/0067306 A1    Mar. 22, 2007

(30) Foreign Application Priority Data

Sep. 21, 2005 (GB) .................................. 0519234.9

(51) Int. Cl.
*G06F 17/30* (2006.01)
*G09B 5/00* (2006.01)
*H04L 29/08* (2006.01)

(52) U.S. Cl.
CPC .............. *G09B 5/00* (2013.01); *H04L 67/2842* (2013.01); *H04L 67/306* (2013.01); *H04L 67/1095* (2013.01)
USPC ............................ 707/705; 707/706; 707/707

(58) Field of Classification Search
USPC ...................................................... 707/1–206
See application file for complete search history.

(56) References Cited

U.S. PATENT DOCUMENTS

| | | | |
|---|---|---|---|
| 6,189,008 B1 * | 2/2001 | Easty et al. ............................ 1/1 |
| 6,199,045 B1 * | 3/2001 | Giniger et al. ................. 705/1.1 |
| 6,490,587 B2 * | 12/2002 | Easty et al. ............................ 1/1 |
| 6,606,480 B1 | 8/2003 | L'Allier et al. ................ 434/362 |
| 6,647,425 B1 | 11/2003 | Chaddha ........................ 709/233 |
| 6,718,361 B1 * | 4/2004 | Basani et al. .................. 709/201 |
| 6,884,074 B2 | 4/2005 | Thielmann ..................... 434/118 |
| 6,892,049 B2 | 5/2005 | Phalp et al. .................... 434/350 |
| 2001/0042000 A1 * | 11/2001 | Defoor, Jr. ......................... 705/9 |
| 2002/0029384 A1 | 3/2002 | Griggs ............................. 725/46 |
| 2002/0143827 A1 * | 10/2002 | Crandall ........................ 707/530 |
| 2002/0178271 A1 * | 11/2002 | Graham et al. ................ 709/229 |
| 2003/0046239 A1 * | 3/2003 | Geilfuss et al. ................. 705/51 |
| 2003/0069991 A1 * | 4/2003 | Brescia .......................... 709/245 |
| 2003/0083954 A1 * | 5/2003 | Namba ............................ 705/26 |
| 2003/0097564 A1 * | 5/2003 | Tewari et al. .................. 713/171 |
| 2003/0105826 A1 * | 6/2003 | Mayraz .......................... 709/206 |
| 2003/0120593 A1 * | 6/2003 | Bansal et al. .................... 705/39 |
| 2003/0120680 A1 * | 6/2003 | Agrawal et al. ........... 707/103 R |
| 2003/0229638 A1 * | 12/2003 | Carpenter et al. .............. 707/10 |
| 2004/0023666 A1 * | 2/2004 | Moon et al. ................. 455/456.1 |
| 2004/0044774 A1 * | 3/2004 | Mangalik et al. ............. 709/227 |

(Continued)

FOREIGN PATENT DOCUMENTS

GB            2348308           9/2000

*Primary Examiner* — Angelica Ruiz
(74) *Attorney, Agent, or Firm* — David A. Dagg

(57) ABSTRACT

A method of operating a content management system, the content management system including a central server and a plurality of content servers connected to the central server, each content server associated with a respective location, the method including receiving data at the central server for distribution to at least one of the content servers, accessing user information relating to one or more users at one or more locations, determining, from the user information, whether the received data is relevant to each user, and transmitting the data from the central server to one or more content servers according to whether the data is relevant for users at the respective locations of the content servers.

13 Claims, 3 Drawing Sheets

(56) References Cited

U.S. PATENT DOCUMENTS

| | | | |
|---|---|---|---|
| 2004/0073596 A1* | 4/2004 | Kloninger et al. | 709/200 |
| 2004/0103085 A1* | 5/2004 | Ly et al. | 707/3 |
| 2004/0148313 A1 | 7/2004 | Lu et al. | 707/104.1 |
| 2004/0158731 A1* | 8/2004 | Narin et al. | 713/200 |
| 2004/0197759 A1* | 10/2004 | Olson | 434/322 |
| 2004/0220926 A1* | 11/2004 | Lamkin et al. | 707/3 |
| 2004/0230566 A1* | 11/2004 | Balijepalli et al. | 707/3 |
| 2005/0132120 A1* | 6/2005 | Vijay | 711/100 |
| 2005/0193341 A1* | 9/2005 | Hayward et al. | 715/716 |
| 2005/0198238 A1* | 9/2005 | Sim et al. | 709/222 |
| 2006/0122900 A1* | 6/2006 | Bean et al. | 705/26 |
| 2006/0123010 A1* | 6/2006 | Landry et al. | 707/10 |
| 2006/0190413 A1* | 8/2006 | Harper | 705/65 |
| 2006/0259469 A1* | 11/2006 | Chiu | 707/3 |
| 2007/0016650 A1* | 1/2007 | Gilbert et al. | 709/207 |
| 2007/0055674 A1* | 3/2007 | Sunada | 707/10 |
| 2007/0129953 A1* | 6/2007 | Cunningham et al. | 705/1 |

\* cited by examiner

CONTENT MANAGEMENT SYSTEM

CROSS REFERENCE TO RELATED APPLICATIONS

The present application claims priority under 35 USC 119 to United Kingdom Application Number GB0519234.9, filed Sep. 21, 2005.

FIELD OF THE INVENTION

This invention relates to a content management system and to a method of operating a content management system. The invention provides the personalized distribution of learning content.

BACKGROUND OF THE INVENTION

In a computer network it is common to have a server connected to a plurality of client devices, with the server handling a variety of centralized functions such as storage, system management and access to external networks such as the Internet. In very large computer networks, involving large numbers of client devices (frequently numbering in the thousands of devices), there will be several interconnected servers, with each server connected locally to some of the client devices. This system is common when the client devices are spread geographically over several separate locations, with each server based in a specific location, and a central server being provided that is responsible for tasks such as replicating data between the local servers, to ensure synchronization of content between the servers.

The distribution of data between the servers can be a very intensive task in terms of bandwidth from the central server to the local servers and can take a relatively long time to achieve. The problem is that whenever content is changed, this change will need to be updated on all distributed servers in all locations, which is time consuming, even if the information is not being used by a certain location, it is still being saved, backed up, and updated, and there is no system in place to know which data is needed in a particular location and only saved, backup and update this data.

Most content managers (run by the central server) have the concept of being connected to streaming servers that can serve audio and video and the central content server will save information about all content in an organization, and when a certain content is known to be audio it will be saved on the audio streaming server, and video content on the video streaming server, and multiple streaming servers can exist in multiple locations to increase performance when a user is accessing the data, so the user is directed to the location closer to him/ if there is one, which increase download performance and reduce load from the central server. The solutions that exist currently will either replicate all data on several servers, or will replicate data to several servers according to the format of this data (audio, video, . . . etc.).

It is therefore an object of the invention to improve upon the known art.

SUMMARY OF THE INVENTION

According to a first aspect of the present invention, there is provided a method of operating a content management system, the content management system comprising a central server and a plurality of content servers connected to the central server, each content server associated with a respective location, the method comprising the steps of receiving data at the central server for distribution to at least one of the content servers, accessing user information relating to one or more users at one or more locations, determining, from the user information, whether the received data is relevant to each user, and transmitting the data from the central server to one or more content servers according to whether the data is relevant for users at the respective locations of the content servers.

According to a second aspect of the present invention, there is provided a content management system comprising a central server and a plurality of content servers connected to the central server, each content server associated with a respective location, the central server arranged to receive data for distribution to at least one of the content servers, to access user information relating to one or more users at one or more locations, to determine, from the user information, whether the received data is relevant to each user, and to transmit the data to one or more content servers according to whether the data is relevant for users at the respective locations of the content servers.

According to a third aspect of the present invention, there is provided a computer program product on a computer readable medium, for operating a content management system, the content management system comprising a central server and a plurality of content servers connected to the central server, each content server associated with a respective location, and comprising instructions for receiving data at the central server for distribution to at least one of the content servers, accessing user information relating to one or more users at one or more locations, determining, from the user information, whether the received data is relevant to each user, and transmitting the data from the central server to one or more content servers according to whether the data is relevant for users at the respective locations of the content servers.

Owing to the invention, it is possible to provide a content management system that will only replicate data around the system to those servers that are likely to need the data. By better integrating information that is known about users in all locations of an organization, which can be from a directory server, skills database, or any human resources database, it can be determined which particular content that a user is most likely to require, and data can be transmitted accordingly to that location.

In one embodiment, the system further comprises a directory server, the directory server storing the user information, and a skills database, the skills database storing a matrix of job titles, appropriate skills, and courses relating to those skills. The user information includes user location and user job title, and the received data for distribution to at least one of the content servers comprises course material. The central server, when determining, from the user information, whether the course material is relevant to each user, accesses the skills database and makes a comparison between the user job title and the matrix stored in the skills database.

The skills database can also contain information about career paths in the organization, so that the central server can determine the next job for an employee and can find the skills this job needs and can therefore find the courses for these skills and make them available at the site of the employee. For every skill there can be a set of proficiency levels, and courses or learning objects can be associated with a skill in general, and with a proficiency level of the skill.

BRIEF DESCRIPTION OF THE DRAWINGS

In order to facilitate a fuller understanding of the present invention, reference is now made to the appended drawings.

DETAILED DESCRIPTION OF EXEMPLARY EMBODIMENTS

Figure 1:
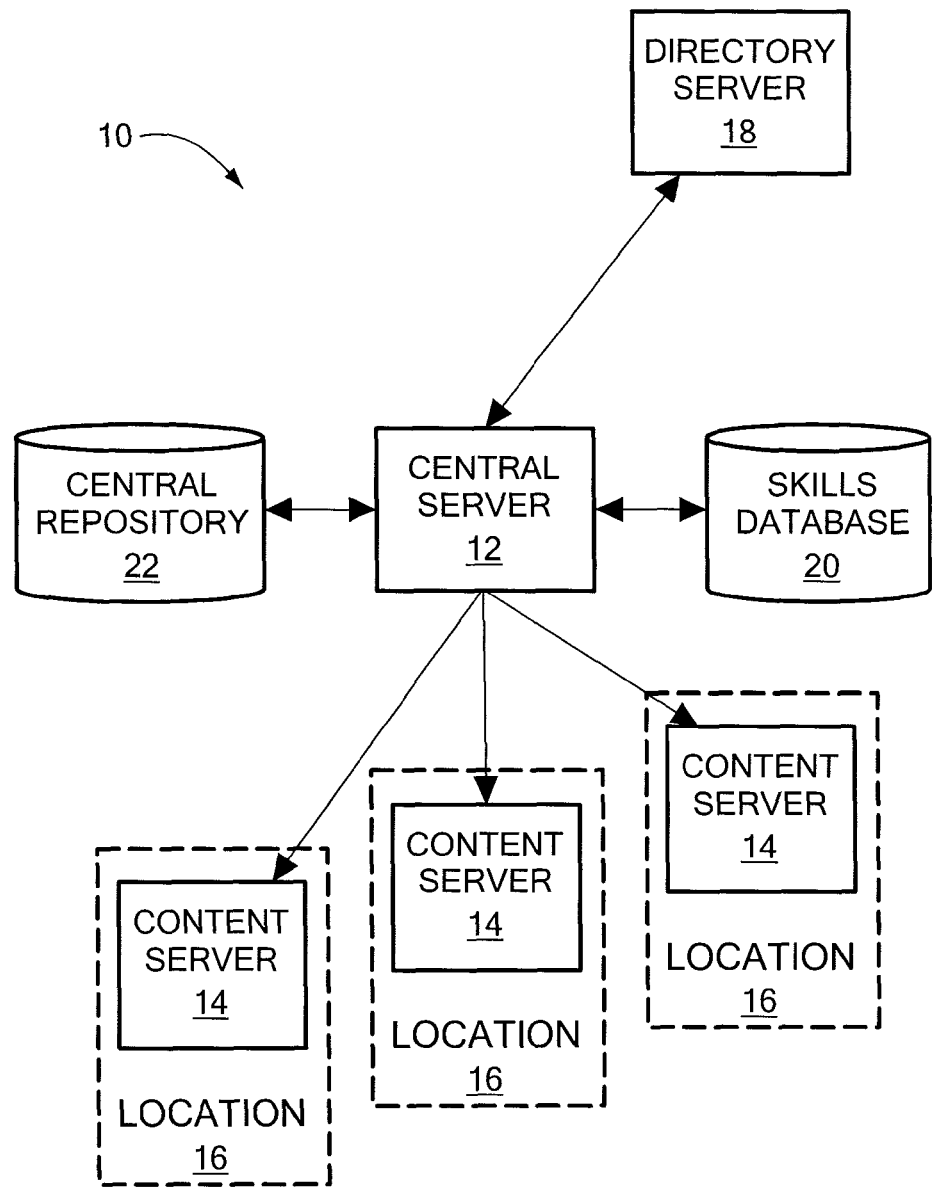
FIG. 1 is a schematic diagram of a content management system.
Figure 2:
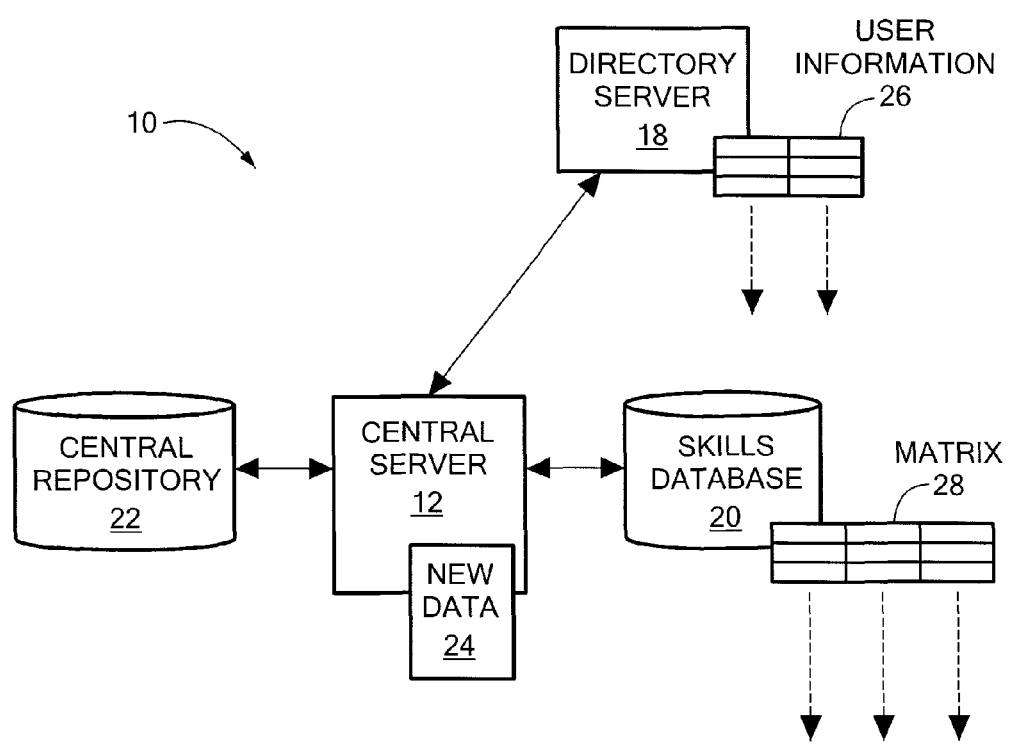
FIG. 2 is a schematic diagram of a portion of the content management system of FIG. 1.

FIGS. 1 and 2 show a content management system 10, which includes a central server 12 and a plurality of content servers 14 connected to the central server 12. Each content server 14 is associated with a respective location 16 and will connect to local client devices (not shown for reasons of clarity). The content management system 10 also includes a directory server 18, a skills database 20 and a central repository 22, which all connect directly to the central server 12. These elements support the function of the central server, and their operation is discussed in more detail below.

In the embodiment described with reference to the Figures, the content management system 10 includes information about learning content in an organization, and provides a mechanism for users at the different locations 16 to find this information. The information stored is very large and increases in proportion to the size of the company. The servers 14 provide a clustered environment where the data is replicated across multiple servers to reduce load on the central server 12, and these clusters in some cases are geographically distributed to provide a server 14 closer to the various locations in an organization and increase the speed of transfer for this information.

However, an efficient process is required for data that is received for distribution to the content servers 14 (the data replication). This data replication takes into consideration whether the particular data is needed by the location to which it is being sent, so a branch of an organization might need access to all sales and marketing courses, and products descriptions, but it does not have developers, so it does not need courses in this area. The system 10 automates the replication of data across the servers 14 according to the profiles of users in those locations and only replicates relevant learning data.

The directory server 18 of the organization will store each employee location and job title, and the skills database 20 will store the job description of an employee from his/her title, and all skills required for that job, and all courses required for those skills. The system 10 also has the functionality to allow administrators to import courses to the content repository 22 of the organization, and track employees who enrolled in courses and whether they passed them or not, and to update their skills records accordingly.

The central server 12 is controlling the replication of the data within the system 10, as the server 12 knows about the content stored in the repository 22, and also knows about all replica locations in the organization to which learning material can be copied, and also knows when the information is changed so that the server 12 can update this information on the replica servers 14.

The central server 12 will analyze the directory entries of employees on scheduled periodic basis or when they log on to the system, and will know their location and if there is a replica content server 14 in that location or not. The central server 12 will analyze the current skill set of employees, and what training is needed by these employees to fulfill their job, and what skills are required for their next job in the career path, and what training is needed to gain the skills needed for that job.

The central server 12 will search for all these courses, and once found, replicate them to the locations where these employees work. Therefore, when an employee searches for training and tries to enroll in a course, this course will most likely be available locally on a server 14, and this will reduce load on the central server 12, and increase performance for the employee.

In addition, when any learning content is modified, this will be imported to the central server 12, which will check to see if this particular content is replicated to any content server 14, and it will replicate this content to all servers that already have it.

When new data 24 is added to the repository 22, a scheduled task will be created to be run by the central server 12 at an off peak time that will check what skills require this learning content, and then what jobs need this skill, and employees who are in this job, and their locations 16, and the content will be replicated to the servers 14 in these locations 16.

The central server 12 is arranged to receive the data 24, which comprises course material, for distribution to at least one of the content servers 14, and accesses user information 26 relating to the users which is stored by the directory server 18. The user information 26 includes user location and user job title. The central server 12, also during the update process, accesses the skills database 20, the skills database 20 storing a matrix 28 of job titles, appropriate skills, and courses relating to those skills.

Figure 3:
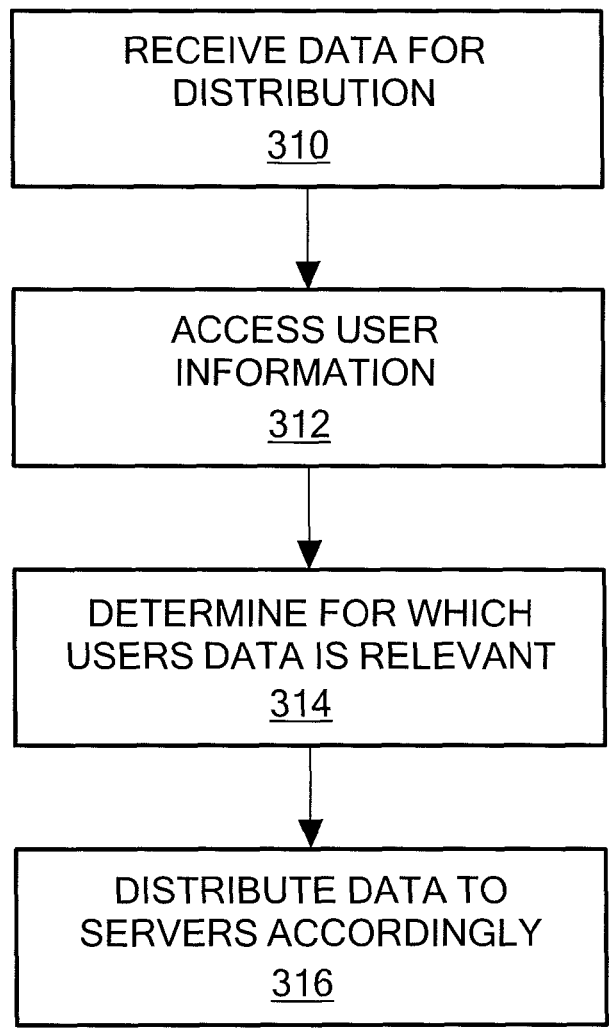
FIG. 3 is a flowchart of a method of operating the content management system.

FIG. 3 shows a flowchart of the method of operating the content management system 10. At the first step 310, the central server 12 receives data 24 for distribution amongst the content servers 14. This data 24 can be learning materials such as course material, which an end user would access to complete a study course, either as a form of distance learning or in an online session.

Once the central server 12 has received the data 24, the central server 12 executes the second step 312, which comprises the accessing of user information 26. This user information 26 relates to the users who have access to the content servers 14. This information 26 could include the user's location and could include the user's job title. Other user information 26 could be accessed by the central server 12, such as the learning history (training completed to date by an employee) or the career progression (the future career path of the employee).

At step 314, the central server 12 determines, from the user information 26, whether the received data 24 is relevant to each user. The received data 24 is relevant to a user if they are likely to access the data 24 in the future. For example, if the data 24 includes course material relating to accounting, and the user information 26 indicates that a user has a job title such as accounts manager, then the data 24 can be considered relevant to that user. Higher levels of detail can be used to determine the relevance of the data 24 to a user, for example, the data could be course material that relates to a particular grade of employee in the accounting function, such as a course that is required to be passed to be eligible for promotion to a specific grade. In this case job title or employee grade may be the user information obtained by the central server 12 to determine whether the data 24 is relevant to a user.

Once step 314 has been completed, the central server 12 will execute the final step 316, which results in the central server 12 transmitting the data 24 to one or more of the content servers 14 according to whether the data 24 is relevant for users at the respective locations 16 of the content servers 14. The content servers 14 only receive the data 24 if it is relevant to users at the location of the content server 14.

The central server 12, when determining, from the user information 26, whether the course material 24 is relevant to each user, in one embodiment, can access the skills database 20 and makes a comparison between the user job title and the matrix 28 stored in the skills database 20. The matrix 28 comprises job titles, appropriate skills, and courses relating to those skills, and is one way of achieving the step 314 of determining the relevance of the data 24 to the user information 26.

The skills database 20 can also contain information about career paths in the organization, so that the central server 12 can determine the next job for an employee and can find the skills this job needs and can therefore find the courses for these skills and make them available at the location 16 of the employee. For every skill there can be a set of proficiency levels, and courses or learning objects can be associated with a skill in general, and with a proficiency level of the skill.

In this way, the central server 12 will determine which of the content servers 14 should receive the new courses (embodied by the data 24), and data is only transmitted to the servers 14 where there is a high likelihood of the data being accessed by the users in the corresponding location 16.

The scope of the present disclosure includes any novel feature or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

For the avoidance of doubt, the term "comprising", as used herein throughout the description and claims is not to be construed as meaning "consisting only of".

The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

We claim:

1. A method of operating a content management system, the content management system including a central server and a plurality of content servers connected to the central server, each content server associated with a respective location, comprising:

receiving data at the central server for distribution to at least one of the content servers;

accessing, by the central server responsive to said receiving data at the central server for distribution to the at least one of the content servers, user information relating to one or more users at one or more locations, wherein the user information contains the locations and job titles of users located at each one of the respective locations of the content servers;

determining, responsive to the accessing of the user information, and based on the user locations and job titles contained in the accessed user information, on the received data, and on locations of the content servers, whether the received data is needed by users located at individual ones of the respective locations of the content servers; and selectively transmitting the data from the central server to one or more content servers responsive to the determining whether the data is needed by users at the respective locations of the content servers, such that the data is only transmitted to at least one of the content servers where the data is needed by users at the same location.

2. The method of claim 1, wherein the received data for distribution to at least one of the content servers comprises course material.

3. The method of claim 1, further comprising accessing a matrix of job titles, appropriate skills, and courses relating to those skills.

4. The method of claim 3, further comprising:

determining, from the user information, whether the course material is relevant to each user by making a comparison between the user job title and the matrix.

5. The method of claim 1, wherein the user information comprises learning history.

6. The method of claim 1, wherein the user information comprises career progression.

7. A system for operating a content management system, the content management system including a central server and a plurality of content servers connected to the central server, each content server associated with a respective location, the central server including at least one processor and a computer readable storage medium having program code stored thereon, the program code comprising:

program code for receiving data at the central server for distribution to at least one of the content servers;

program code for accessing, by the central server responsive to said receiving data at the central server for distribution to the at least one of the content servers, user information relating to one or more users at one or more locations, wherein the user information contains the locations and job titles of users located at each one of the respective locations of the content servers;

program code for determining, responsive to the accessing of the user information, and based on the user locations and job titles contained in the accessed user information, on the received data, and on locations of the content servers, whether the received data is needed by users located at individual ones of the respective locations of the content servers; and program code for selectively transmitting the data from the central server to one or more content servers responsive to the determining whether the data is needed by users at the respective locations of the content servers, such that the data is only transmitted to at least one of the content servers where the data is needed by users at the same location.

8. The system of claim 7, wherein the user information includes user location and user job title.

9. The system of claim 7, wherein the received data for distribution to at least one of the content servers comprises course material.

10. The system of claim 7, the program code further comprising:

program code for accessing a matrix of job titles, appropriate skills, and courses relating to those skills.

11. The system of claim 10, the program code further comprising:

program code for determining, from the user information, whether the course material is relevant to each user by making a comparison between the user job title and the matrix.

12. The system of claim 11, wherein the user information comprises learning history.

13. The system of claim 7, wherein the user information comprises career progression.

* * * * *